Nov. 18, 1952 J. W. SILVER ET AL 2,618,385
SCREENING DEVICE
Filed June 28, 1950 5 Sheets-Sheet 2
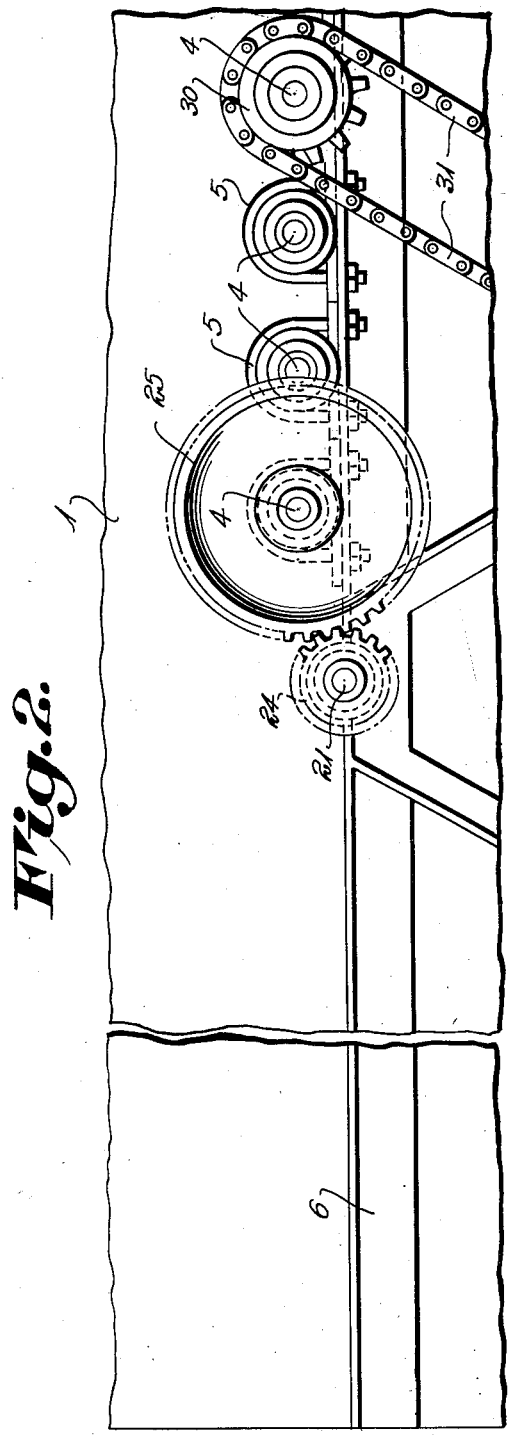
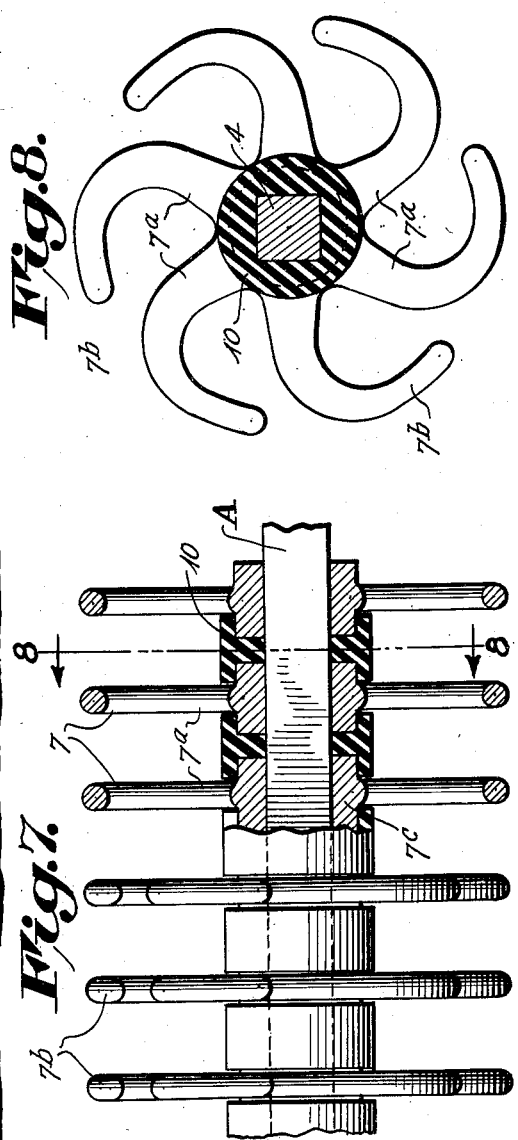
INVENTORS
James W. Silver
Joseph M. Silver
BY
Alexander Dowell
ATTORNEYS Nov. 18, 1952  J. W. SILVER ET AL  2,618,385
SCREENING DEVICE Filed June 28, 1950  5 Sheets-Sheet 3

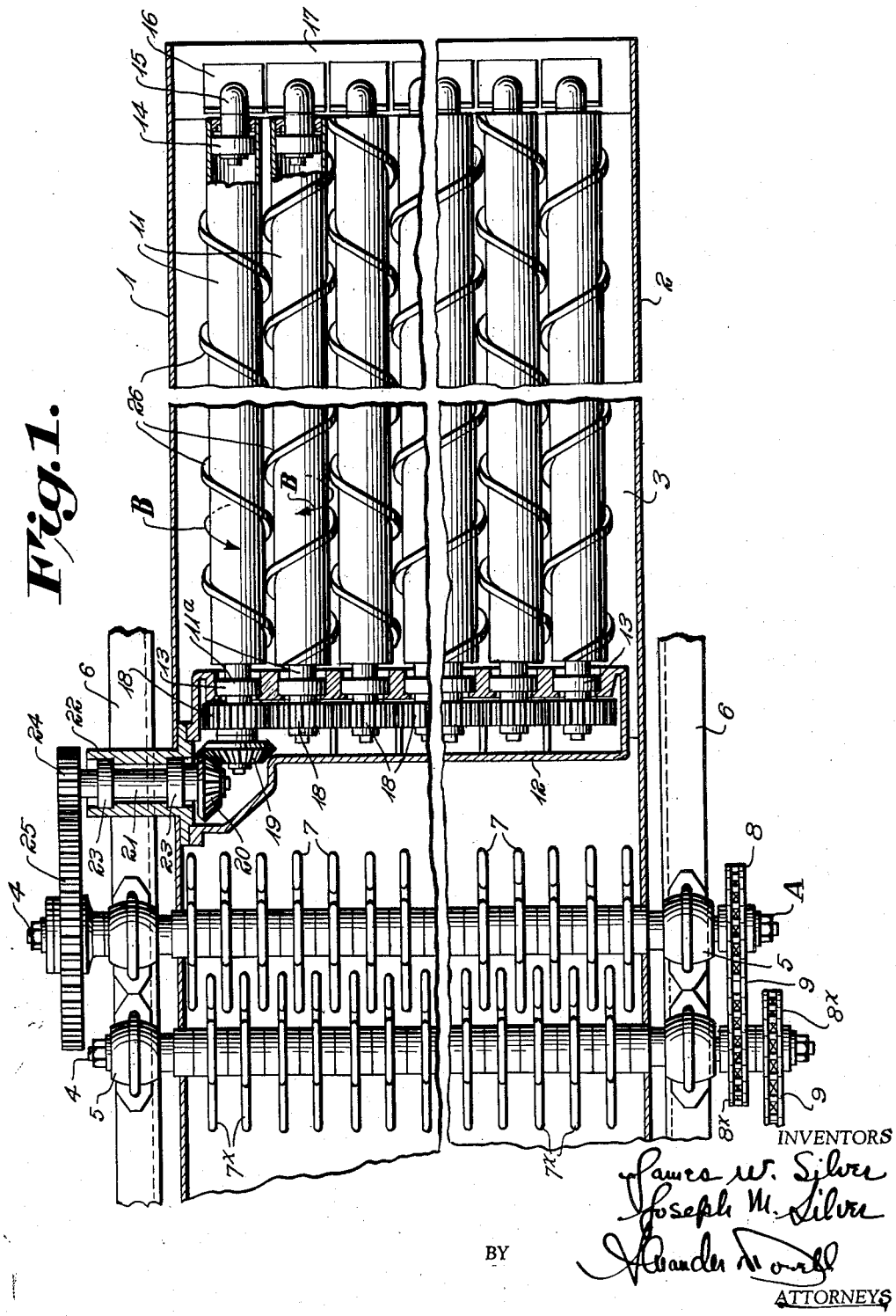

INVENTORS
James W. Silver
Joseph M. Silver
BY
ATTORNEYS

Nov. 18, 1952 — J. W. SILVER ET AL — 2,618,385
SCREENING DEVICE
Filed June 28, 1950 — 5 Sheets-Sheet 4
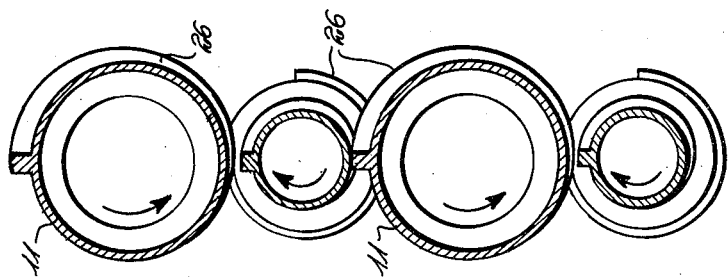
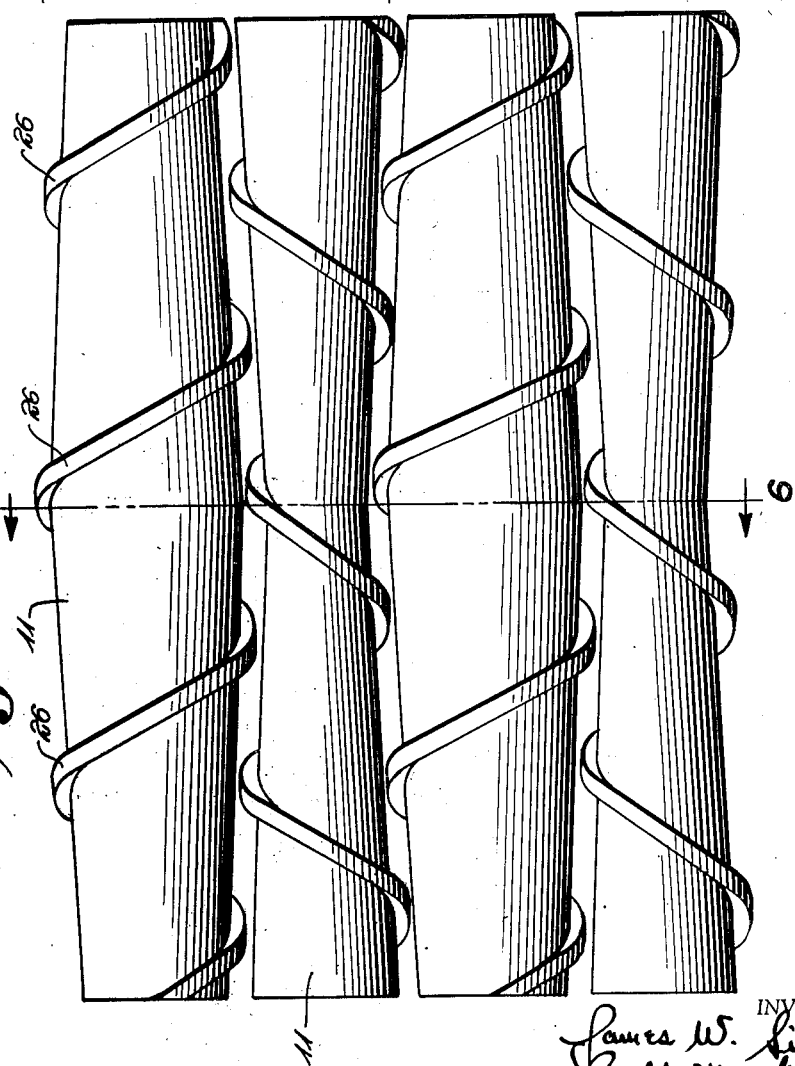
INVENTORS
James W. Silver
Joseph M. Silver
BY Alexander Powell
ATTORNEYS Patented Nov. 18, 1952

2,618,385

UNITED STATES PATENT OFFICE 2,618,385

SCREENING DEVICE

James W. Silver and Joseph M. Silver, Ogden, Utah, assignors to Ogden Iron Works Co., Ogden, Utah, a corporation of Utah Application June 28, 1950, Serial No. 170,818

1 Claim. (Cl. 209—107)

Our invention relates to flexible screening devices, particularly adapted for use in connection with sugar-beet pilers or the like; and the principal object of the invention is to provide a screening device consisting of a dirt hopper above which is disposed a first unit containing forwarding screening elements mounted upon parallel rotating transversely disposed shafts, the elements of certain shafts being flexible with respect to and arranged in staggered relation to the elements on adjacent shafts; and said first unit preceding a second unit in which the shafts are disposed axially of the hopper and which carry spiral ribs, the adjacent shafts of the second unit rotating in opposite directions to forward the screened beets to the delivery end of the hopper.

A further object of our invention is to provide flexible screening elements in the first unit, which permit rocking or flexing of the elements carried by the shaft to permit foreign substances to pass through the screen into the dirt hopper without causing the unit to become jammed or stopped by such foreign material, said unit being disposed ahead of the spiral leaf and trash remover, so that the latter unit will perform without clogging as the loose dirt and rocks are removed before reaching the second unit.

We will explain the invention with reference to the accompanying drawings, which illustrate several practical embodiments thereof, to enable others familiar with the art to adopt and use the same; and will summarize in the claim the novel features of construction, and novel combinations of parts, for which protection is desired.

In said drawings:

Fig. 1 is a top plan view of the first and second units, showing the arrangement of elements of the first and second units; also showing the gearing for rotating the shafts of said units.

Fig. 2 is a side elevation showing the main drive for the units.

Fig. 5 is a view showing a modified second unit in which the shafts thereof are tapered rather than truly cylindrical.

Fig. 6 is a transverse section on the line 6—6, Fig. 5.

Fig. 7 is an enlarged elevation, partly in section, showing the provision of flexible spacers between the rigid screening elements of the first unit.

Fig. 8 is a transverse section on the line 8—8, Fig. 7.

In accordance with our invention, the flexible screening device is adapted to be incorporated in the customary sugar-beet pilers, or the like, although the same may be incorporated in any other beet-handling machines. In passing through the beet-piler, the sugar-beets which have just been harvested are arranged to pass over our novel flexible screening device. However, our novel screening device may be arranged as a separate unit from the beet-piler or the like.

As shown in Fig. 1, the beet-screening device embodies a trough-shaped casing having parallel side walls 1 and 2, in the lower portion of which is arranged the first unit, followed by the second unit, as hereinafter described, the units being disposed in the lower portions of the trough. In the bottom of the trough is a dirt hopper 3, Figs. 1 and 3, into which the foreign material is discharged as hereinafter described.

Figure 3:
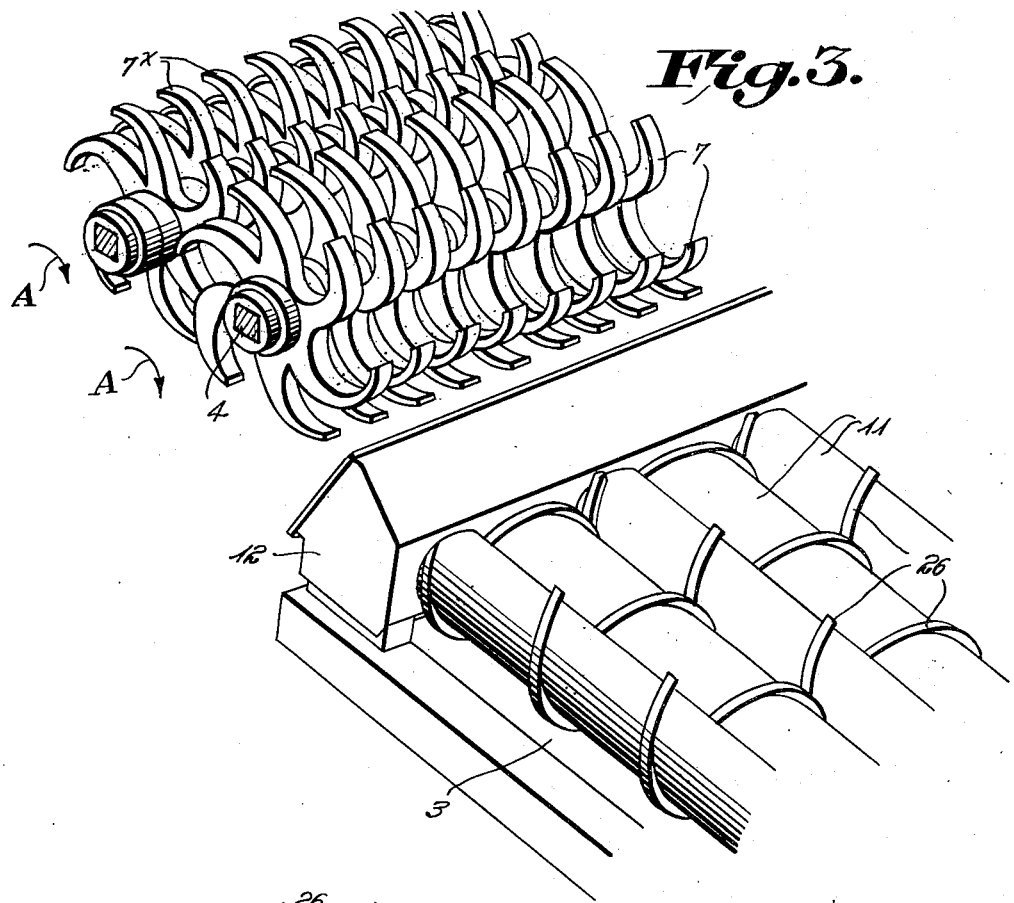
Fig. 3 is a perspective view of the adjacent portions of the two units.

The first unit consists of a plurality of parallel shafts 4, arranged transversely of the trough and dirt hopper, as clearly indicated in Figs. 1 and 3, said shafts 4 being respectively journaled in bearings 5 on the frame 6 of the machine. On certain of the shafts 4 are arranged a series of spaced rotary screening elements 7, the same having hubs 7c provided with non-circular bores receiving the correspondingly shaped shafts 4, whereby the elements 7 will be caused to rotate in the same direction as their respective shafts 4.

As shown in Figs. 1, 3, 7 and 8, the elements 7 on alternate shafts are provided with radial arms 7a, the outer portions 7b of which are curved in the same direction so that said outer portions are disposed substatnially parallel with the peripheries of the hubs 7c of the elements, thereby presenting a broken substantially cylindrical periphery to the elements 7, as clearly indicated in Fig. 8. The elements 7 and their hubs 7c are formed integrally of steel or other durable material. The elements 7x on the intermediate shafts are formed of rubber or other yieldable material, same however having the same general shape as the elements 7 shown in Figs. 7 and 8; the elements 7x being thus obviously flexible so as to permit longitudinal and lateral bending of their arms and outer portions during the screening operation. As a modification, however, the elements 7 as well as the elements 7x may be formed of rubber or other resilient yieldable material so that all the elements 7 and 7x may be subject to longitudinal and lateral bending of their arms and outer portions.

The outer ends of the elements 7x are staggered with respect to the outer ends 7b of the elements 7 on adjacent shafts, so that the outer portions of the elements 7 and 7x, all moving in the same direction, form a screening unit in which certain or all of the elements 7 and 7x are longitudinally and laterally flexible, the outer portions 7b of the rotating elements 7—7x moving the beets which are dumped thereon towards the right-hand end of Fig. 1.

The shafts 4 of the first unit are rotated in the same direction so that the elements 7—7x will rotate in the direction of the arrows A (Fig. 3). As shown, adjacent shafts 4 are provided with sprockets 8 and 8x respectively (Fig. 1) around which run chains 9 whereby the adjacent shafts are driven at the same peripheral speed in the desired direction of rotation; and the intermediate shafts 4, as shown in Fig. 1, are provided with additional sprockets 8x around which run similar chains 9 which also run around sprockets (not shown) on the next adjacent shafts (Fig. 1).

As shown in Figs. 7 and 8, rubber spacers 10 are provided between the adjacent hubs 7c of the rigid elements 7 on the shafts 4. These rubber spacers have non-circular bores for the reception of the shafts 4 and have outer flanges overlying the adjacent ends of adjacent hubs 7c of the elements 7. The use of these rubber spacers 10 provides a covering on the exteriors of the hubs 7c of the rigid elements 7, as well as rubber cushions between the faces of adjacent hubs. The use of these rubber spacers 10, and the fact that the non-circular holes in the hubs 7c of the elements 7 are slightly larger than the size of the non-circular shafts 4, allow a certain flexibility or angularity of adjacent rigid elements 7 in event a rock or foreign substance should become wedged therebetween.

Figure 4:
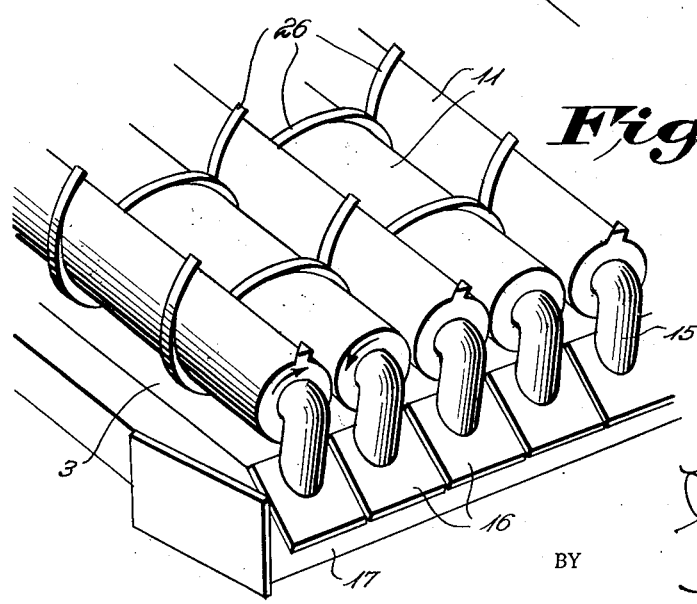
Fig. 4 is a perspective view of the means for rotatably mounting the outer ends of the shafts of the second unit.

The second screening unit, as shown in Fig. 1, consists of a series of parallel closely adjacent shafts 11 which are disposed parallel with the axis of the trough 1—2, the said shafts 11 having at their forward ends reductions 11a which pass into a gear housing 12, antifriction bearings 13 being provided between the shaft reductions 11a and housing 12. The other ends of the shafts 11 are tubular and interiorly engage antifriction bearings 14 (Fig. 1) carried by L-shaped stub shafts 15 mounted on brackets 16 secured upon the frame member 17 of the machine, as clearly indicated in Figs. 1 and 4. The shaft reductions 11a of the shafts 11 extend within gear housing 12, and each carries a gear 18 which meshes with a corresponding gear of same size on the next adjacent shafts, so that the adjacent shafts 11 are caused to rotate in opposite directions, as indicated by the arrows B on shafts 11 (Fig. 1).

Rotary motion is imparted to one of the gears 18 by a bevel gear 19 on the shaft extension 11a of one of the outermost shafts 11, which gear 19 meshes with a bevel gear 20 on a shaft 21 which is journaled in a housing 22 at the adjacent side of the machine frame, said shaft 21 being mounted in antifriction bearings 23 and carrying on its outer end a gear 24 meshing with a larger gear 25 which is fixedly mounted on the rearmost shaft 4 of the first unit, as clearly shown in Fig. 1, whereby rotation of said shaft 4 will cause simultaneous rotation of the shafts 11 at a much increased speed, the adjacent shafts 11 however, rotating in opposite directions, as indicated by the arrows B.

As shown in Fig. 1, on the shafts 11 are spiral ribs 26 which cooperate to forward the beets dropped thereon and move them towards the right-hand end (Fig. 1) of the second unit, the action being such that the beets and such dirt, trash and leaves not removed while the beets are passing over the first unit, will be discharged onto the second unit where the leaves and trash are removed and dropped between pairs of adjacent shafts 11 into the underlying dirt hopper 3 while the beets travel forwardly and are discharged over the second unit onto a piling conveyor or the like.

The shafts 11 shown in Fig. 1 are cylindrical in shape; however, it may be found advantageous to make the shafts of tapered shape, as shown more particularly in Figs. 5 and 6, in which one shaft of each adjacent pair has its taper increasing in diameter towards the mid-point of the shaft while the adjacent shaft 11 has its taper decreasing in diameter towards its midpoint. In this modification, the peripheral speeds of all of the tapered shafts 11 would be the same adjacent the ends of the shafts where the diameters are substantially equal, but the convex tapered shafts would have greater peripheral speeds adjacent their mid-points than the concave tapered shafts. This novel arrangement will have the effect of turning the beets over as they pass along the shafts 11, which is a desirable feature in that it will cause any dirt or leaves riding on the tops of the beets passing over the shafts 11 to be forced down between the trash removing shafts 11 when the beets are turned over.

As a further modification, one of each pair of oppositely rotating shafts 11 may be smooth, i. e., without ribs 26; and the smooth shafts may be made of metal, or may comprise a metallic core having a rubber or other yieldable cover vulcanized or mounted thereon.

Figure 9:
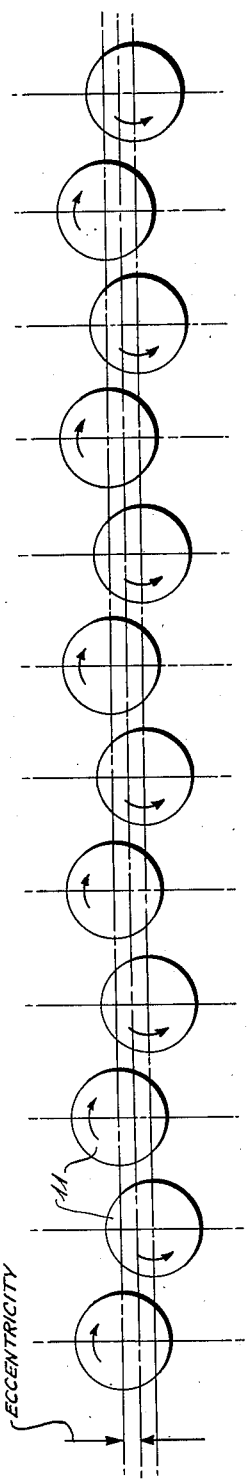
Figs. 9 and 10 are diagrammatic views showing a modified arrangement of the shafts of the second unit in which the axes of the shafts are eccentrically mounted.
Figure 10:
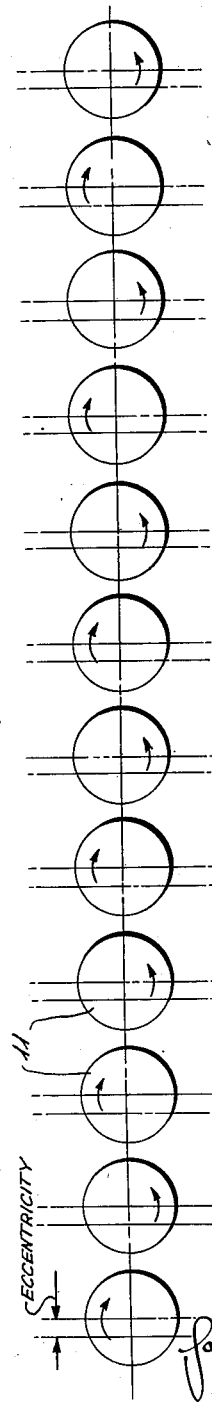

A still further modification is shown in Figs. 9 and 10, in which the oppositely rotating shafts 11 of the second unit are eccentrically arranged so that during rotation the shafts move up and down thereby agitating the beets while the latter are being propelled toward the discharge end of the unit, thus producing the effect of tumbling the beets, giving increased screening efficiency. In Fig. 9 the alternate shafts 11 are shown with their eccentricity axes disposed below or above their geometrical axes, while in Fig. 10, the geometrical and eccentricity axes are aligned in the same horizontal plane.

Both the first and second units are simultaneously driven by means of a sprocket wheel 30 (Fig. 2) on one of the shafts 4 of the first unit, over which runs a chain 31 which is driven through suitable speed reduction gears or the like from a prime mover (not shown).

*In operation*

The beets are received at the left-hand end (Fig. 1) of the bin 1—2 and carried forward by the rotary action of the elements 7—7x on shafts 4, while much of the dirt and other foreign material will drop from the first unit into the dirt hopper 3 disposed below. The beets and such dirt, trash and leaves not removed while the beets are passing over the first unit are discharged onto the shafts 11 of the spiral leafer screen or second unit where the remaining leaves and trash are removed and discharged into the dirt hopper 3, while the screened beets travel forward and are discharged over the spiral leafer or trash remover towards the right (Fig. 1) onto a beet-piling conveyor or the like.

Our novel flexible screening device includes, as essential features, a flexible revolving screen element; flexible screening elements mounted on parallel rotating shafts; the said flexible screening elements being mounted on all the parallel rotating shafts, or the flexible elements on certain shafts alternating with rigid elements mounted on adjacent rotating shafts; said screening elements being so arranged that each has its projecting finger or outer end staggered with respect to those on the elements of the next adjacent shaft; also flexible screening elements with flexible hub portions, which hub portions may be provided with rigid reinforcements to prevent the hub from slipping on the rotating shaft; flexible screening elements having one rigid reinforcement vulcanized to the hub on one end and rigid reinforcement not vulcanized to the hub on the opposite end; also flexible screening elements arranged on rotary shafts and used in combination with spiral rotating leaf and trash removing elements.

The flexible screening elements permit rocks or other foreign substances to pass through the screen into the dirt hopper without causing the unit to become jammed or stopped by such foreign material, the flexible screening elements being disposed ahead of the leaf and trash remover so that the latter screen will perform without clogging as the bulk of the loose dirt and rocks will be removed before reaching it.

We do not limit our invention to the exact form shown in the drawings, for obviously changes may be made therein within the scope of the claim.

We claim:

A flexible screening device for sugar-beet pilers or the like, comprising a trough; a series of closely adjacent parallel shafts disposed parallel with the axis of the trough; means for rotating the adjacent shafts in opposite directions; and spiral ribs on certain of the shafts adapted to move the beets deposited on the shafts towards one end thereof; said shafts being eccentrically mounted and adapted during rotation to move alternately above and below the common plane of the series.

JAMES W. SILVER.
JOSEPH M. SILVER.

REFERENCES CITED

The following references are of record in the file of this patent:

UNITED STATES PATENTS

| Number | Name | Date |
|---|---|---|
| 436,049 | Watters | Sept. 9, 1890 |
| 483,225 | Lampitt | Sept. 27, 1892 |
| 527,656 | Borchard | Oct. 16, 1894 |
| 530,261 | Distl et al. | Dec. 4, 1894 |
| 575,376 | Rosenthal | Jan. 19, 1897 |
| 712,051 | Elliott | Oct. 29, 1902 |
| 1,387,562 | Spiker | Aug. 16, 1921 |
| 1,641,777 | Newhouse | Sept. 6, 1927 |
| 1,766,340 | Kendall | June 24, 1930 |
| 1,899,292 | Rienks | Feb. 28, 1933 |

FOREIGN PATENTS

| Number | Country | Date |
|---|---|---|
| 305,065 | Italy | Jan. 26, 1933 |
| 600,345 | Germany | July 20, 1934 |